Nov. 29, 1960 N. A. JOHNSON 2,962,041
BRINE TANK CONTROL SYSTEM AND VALVE FOR WATER SOFTENERS
Filed Dec. 12, 1957 2 Sheets-Sheet 1
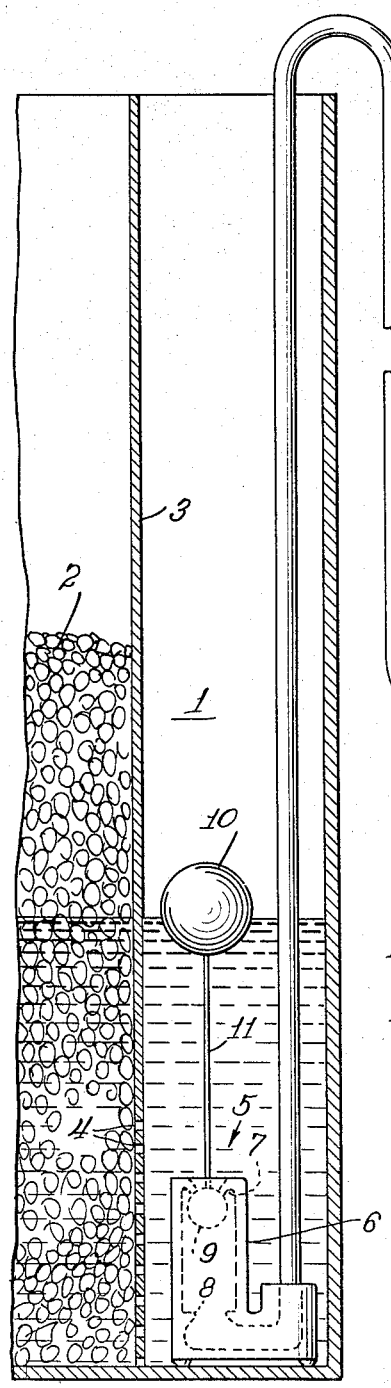
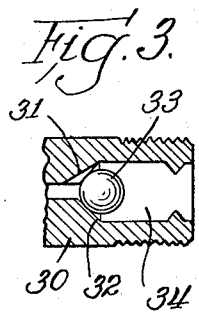
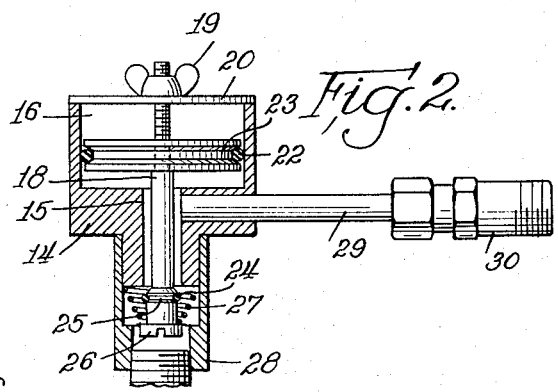
INVENTOR.
Nels A. Johnson
BY
Jones, Darbo & Robertson
Att'ys.

Nov. 29, 1960   N. A. JOHNSON   2,962,041
BRINE TANK CONTROL SYSTEM AND VALVE FOR WATER SOFTENERS
Filed Dec. 12, 1957   2 Sheets-Sheet 2
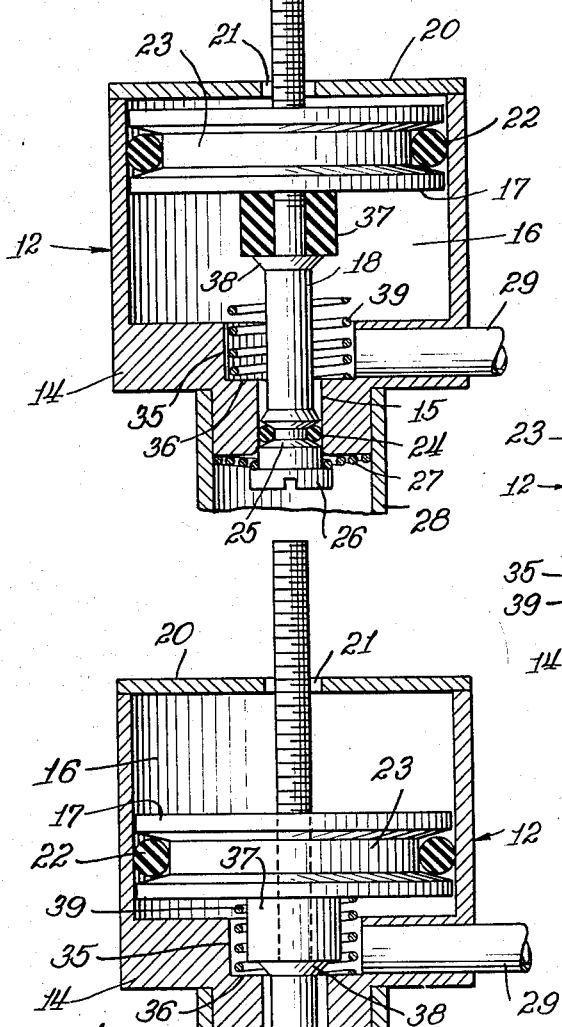
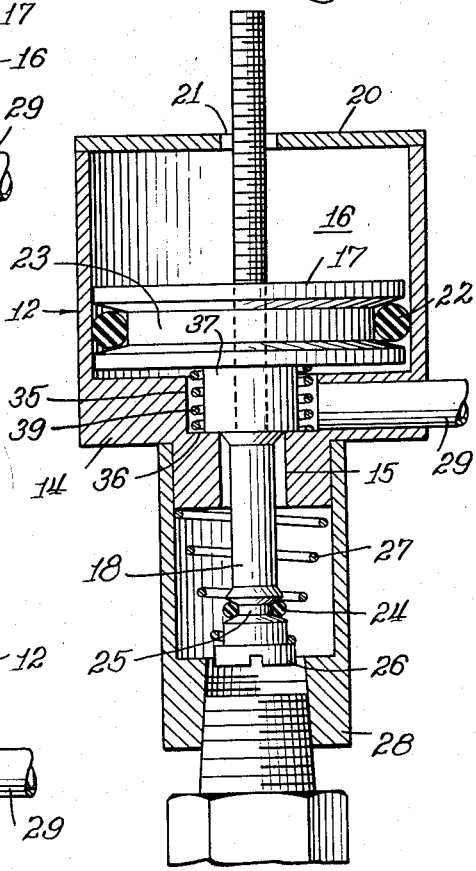
INVENTOR.
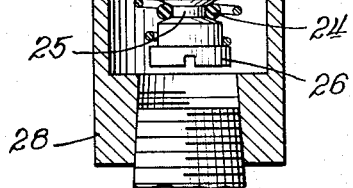

United States Patent Office 2,962,041
Patented Nov. 29, 1960

2,962,041

BRINE TANK CONTROL SYSTEM AND VALVE FOR WATER SOFTENERS

Nels A. Johnson, 154 W. Chicago Ave., Palatine, Ill., assignor of one-half to George M. Munson, Lombard, Ill.

Filed Dec. 12, 1957, Ser. No. 702,428

6 Claims. (Cl. 137—391)

This invention relates to water softening apparatus and particularly to an automatic valve for reliably and positively controlling the flow of make-up water to, and, in another aspect of the invention, the flow of brine from, the brine tank of such apparatus. It may be considered to be in the nature of an auxiliary valve whose function it is to supplement the action of the ordinary float valve usually located in the brine well of the brine tank to insure, in its primary purpose, against the overflowing of the brine tank.

In modern automatic and semi-automatic water softening systems, provision is generally made for the automatic refilling of the brine tank by make-up water after completion of the salting cycle during which brine is withdrawn from the brine tank for the regeneration of the ion exchange material in the softener tank. A float valve is located in the brine tank for the purpose of shutting off the flow of make-up water into the tank after the liquid has reached a pre-determined level. Experience has shown that such systems are very frequently faulty in that the float valve fails to shut off the incoming flow of make-up water completely with the result that the brine tank overflows with consequent damage to the surroundings. Failure of the float valve to operate properly may be caused by sand or other particles preventing the proper seating of the valve, parts of the valve may fail due to corrosion, or other cause.

The present invention is based upon the realistic premise that the brine tank float valve does not shut off the flow of make-up water completely. Many attempts have been made to design a float valve for this service which is completely reliable, but a sufficiently high degree of certainty has never been achieved. The inventor, accordingly, has taken the other tack and provides an auxiliary valve which requires for its operation only that the float valve within the brine tank will act to impede or partially shut off the flow of water into the tank when the level has reached the desired height, such throttling of the flow causing activation of the auxiliary valve to positively and completely shut off the flow.

It is, accordingly, a principal object of the invention to provide a water softening system including an automatically refilling brine tank wherein the flow of make-up water is reliably and completely shut off to insure against overflowing of the brine tank after a sufficient amount has been supplied to the brine tank and after a float or equivalent brine tank valve has operated to check the flow. More specifically, an object of the invention is to provide a pressure operated auxiliary valve of the pressure differential operated type, such as a diaphragm or piston operated valve, for use with the ordinary brine tank float valve to completely shut off the flow of make-up water at the proper time. In another aspect of the invention, the auxiliary valve serves to reliably and positively shut off the flow of brine from the brine tank to the softening tank at the proper time in addition to controlling the flow of make-up water into the tank. Other features and the advantages of the invention will become apparent as the following description proceeds in conjunction with the accompanying drawings, in which—

Fig. 1 is a cross-sectional view showing the brine tank flow control system including the float valve within the brine tank and the auxiliary valve;

Fig. 2 is a cross-sectional view of the auxiliary valve of Fig. 1 shown in its open position;

Fig. 3 is an enlarged detailed view of the check valve forming a part of the system of Fig. 1, the view being taken at line 3—3 of Fig. 1, and Figs. 4, 5 and 6 are cross-sectional views of a double-acting form of the auxiliary valve.

The brine tank partially shown in Fig. 1 is of the so-called dry salt type. The brine well 1 is separated from the salt 2 by a partition 3 having perforations or slots 4 in the lower portion thereof. This arrangement confines the solid salt to the portion of the brine tank outside of the brine well 1 while permitting the free flow of liquid between the brine well and the salt compartment.

A float valve 5, consisting essentially of a body 6 having upper and lower internal seats 7 and 8, respectively, valve plug 9, float 10 and a connecting wire or chain 11, is located at the bottom of brine well 1. Any suitable form of float valve may be used, the particular form shown involving travel of ball plug 9 between the upper seat 7 and lower seat 8, as controlled by the float 10 resting upon the surface of the brine in the well, to check the flow of water into the well at the upper level of the float and out from the well at the lower level. It is not necessary to employ a float valve or refined design and construction intended to insure complete closing of the valve because, as above stated, it is only necessary that the valve substantially impede or partially obstruct or throttle the flow of liquid at the respective extreme levels of the brine. With reference to this operation of the brine float valve, the term "check" is used herein in its broadest sense, meaning partial or complete stoppage of flow. The auxiliary valve 12 contemplated by the invention is a diaphragm valve or piston valve, the latter being shown by way of example. Whether a piston or diaphragm is used to operate and control the valve is a matter of choice of design, the type of valve being referred to herein generically as an atmospheric pressure operated moving control element valve. Its operation depends upon the existence of a superatmospheric or subatmospheric pressure within the valve chamber, the former condition resulting in movement of the diaphragm or piston against atmospheric pressure to which the upper surface of the diaphragm or piston is exposed, the latter condition resulting in downward movement in response to the force of atmospheric pressure. The valve 12 is connected with float valve 5 by suitable tubing 13 and necessary connection fittings.

The auxiliary valve illustrated in Figs. 1 and 2 includes a body 14 having an axial bore 15 and a counterbore 16 forming a cylindrical chamber in which valve piston 17 moves axially with valve stem 18 to which the piston is fastened. The upper portion of the valve stem extending above the piston is threaded to receive a wing nut 19 which may be screwed down against a washer or spider 20 for manually closing the valve or limiting movement of the valve stem on opening of the valve. The washer or spider 20 is a partial closure of valve chamber 16, a central aperture 21, through which the threaded valve stem 18 passes, being sufficiently large to permit the passage of air into and out from the valve chamber with movement of piston 17. An O-ring 22, carried in annular groove 23 which encircles the piston, serves as a piston ring or gasket to prevent passage of fluid from one side of the piston to the other in the valve chamber. A second O-ring 24 is carried in a groove 25 around the lower end portion of the valve stem to operate in bore 15 to close the valve by preventing passage of liquid through this central channel in the valve body. The bottom end of the valve stem is headed at 26 and a spiral compression spring 27 is inserted between the bottom of valve body 14 and the shoulder provided by head 26 to urge the valve stem downwardly to open position of the valve with limited force. Spring 27 operates in aid of atmospheric pressure to open the valve and its use makes it possible to predetermine the pressure differential at which the valve operates. A suitable ferrule 28 encloses the valve mechanism and provides for connection of tubing 13.

A tube 29 provides connection of the valve chamber and central valve channel with the brine aspirator, not shown, a partial check valve 30 being interposed to limit flow of make-up water through auxiliary valve 12 and into the brine tank to that which will pass through a small groove 31 (Fig. 3) in the seat 32 of the check valve 30. In the position of the valve ball 33 shown in Fig. 3, the flow of fresh water to the left is thus limited, while the flow of brine to the right would be permitted without substantial impedance by movement of ball 33 into the chamber 34 of the check.

Auxiliary valve 12 is shown in its open position in Fig. 2. The internal mechanism of the valve has moved downwardly to the level at which O-ring 24 is below the bottom of bore 15 so that liquid may pass between the O-ring and the valve body in flowing between tubes 13 and 29.

Operation of the system thus described is as follows:

The positions of float valve 5 and auxiliary valve 12 shown in Fig. 1 are those which obtain during the water softening portion of the cycle of the system. The brine in the brine tank is at its upper level, ready for withdrawal of brine for regeneration of the ion exchange bed, the float valve being in its upper closed position. Auxiliary valve 12 is closed to prevent the passage of any additional make-up water to the brine tank.

The regeneration portion of the cycle is initiated, either by automatic control means or manually, and suction is applied to tube 29 by the brine aspirator. This suction is transmitted to valve chamber 16 and the result is downward movement of valve piston 17 due to the force of atmospheric pressure to which the top surface of the piston is exposed. This downward movement is assisted by spring 27 and results in the opening of the auxiliary valve, the open position being indicated in Fig. 2. With the opening of this valve, the suction obtaining in the interior of the valve is communicated to tube 13 and the interior of the body of float valve 5. Under these conditions, the float valve, which is actually a float-controlled double check valve, permits the flow of brine from brine well 1 into the chamber of body 6 of the float valve and thence through the system including auxiliary valve 12 and into the softener tank. Brine is thus withdrawn continuously until the level reaches that at which float 10 has lowered valve ball 9 to seat 8 to shut off the flow. This is the end of the salting portion of the cycle to be followed by the rinsing of the brine from the ion exchange material in the softener tank. When the rinsing has been completed, the flow of water through the brine aspirator is discontinued and line pressure is applied at valve 30 for the flow of make-up water back into the brine tank. As the level of liquid in the brine well rises, float 10 moves valve ball 9 upwardly until the predetermined level is reached, this level being that at which ball 9 engages valve seat 7. The flow of make-up water is thus checked and the pressure in valve chamber 16 of the auxiliary valve increases toward full line pressure. This pressure, which is superatmospheric, moves valve piston 17 upwardly to close the auxiliary valve and completely shut off the brine tank from the rest of the system. The cycle is thus completed and the system is ready for the next regeneration.

It will be understood from the foregoing that even though the float valve in the brine well does not positively and reliably shut off the flow of make-up water into the brine tank, but merely serves to check the flow, the auxiliary valve does serve to do so and there is no danger of overflowing of the brine tank. On the other hand, the flow of brine from the brine well, and the suction of air into the softening system in the event that the level of the brine falls below the top of valve body 6, is shut off or prevented only to the extent that float valve 5 is positive in its operation. The auxiliary valve shown in Figs. 1 and 2 does not operate to prevent the possible continued flow of brine or the introduction of air due to the imperfect operation of the float valve when ball 9 is seated upon seat 8. However, the embodiment of the auxiliary valve illustrated in Figs. 4–6 does supplement the action of the float valve to positively shut off the flow of brine upon the seating of float valve ball 9 upon valve seat 8 as will be described with reference to these figures of the drawing.

The valve illustrated in three different possible positions in Figs. 4, 5 and 6 has all of the parts of the valve illustrated in Figs. 1 and 2 and these parts and their operations will not be again described. In addition to these elements an enlargement of central channel 15 in the nature of a counter-bore 35 is provided. The bottom of this counter-bore forms a valve seat 36 adapted to receive and cooperate with a resilient valve plug 37 mounted on valve spindle 18 between an annular shoulder 38 and piston 17. A coil compression spring 39 is arranged in the counter-bore channel enlargement 35. This spring is of sufficiently large diameter to permit the cylindrical valve plug 37 to pass down through it to engage the seat 36. It operates to apply continuing upward force to piston 17 when the piston is in its lower position in valve chamber 16. Connecting tube 29 opens into the channel enlargement 35, which is above valve seat 36 so that tube 29 is in communication with valve chamber 16 at all positions of the valve piston and associated movable mechanism.

It will be apparent that the additional structure included in the valve of Figs. 4–6 converts the single-acting valve of Figs. 1 and 2 into a double-acting valve having a seat with which plug 37 cooperates to close the valve at this point in addition to the cylindrical chamber 15 with which O-ring 24 cooperates in closing the valve in the manner first above described. In the position shown in Fig. 4, the piston is shown at its uppermost position and the valve is closed. In the position shown in Fig. 6, the piston is at its lowermost position and the valve is again closed, this time by plug 37. The valve is open at intermediate positions, such as that illustrated in Fig. 5.

The position of the auxiliary valve during the normal operation of the softener system is, as is described above, that of Fig. 4. The relatively high pressure, substantially line pressure, obtaining in auxiliary valve chamber 16 operates to hold the piston at its uppermost position to keep the valve closed. Suction resulting from the activation of the brine aspirator causes downward movement of the controlling piston to open the valve and to permit the flow of brine to the softener, the position of the valve being then that shown in Fig. 5. Then, when the brine has been withdrawn to the point at which float valve ball 9 seats upon valve seat 8, the continuing application of suction by the aspirator increases the magnitude of the suction in the valve chamber and causes further downward movement of the piston to its lowermost position at which valve plug 37 is in contact with seat 36 to again positively close the valve and prevent the flow into the system of any brine that may leak by the float valve in the brine tank. This final movement of the piston in thus closing the valve compresses spring 39. This spring is so designed that it acts to hold the valve in the open position shown in Fig. 5 when only the normal brine-withdrawing suction is applied to the under surface of the valve piston and it is the increased suction resulting from the checking of flow by float valve 5 and continued suction by the aspirator that operates to overcome the force of the spring to seat the valve as shown in Fig. 6. When the brine aspirator is rendered inoperative following the rinsing portion of the cycle of the system, the spring, together with increasing pressure in valve chamber 16, operates to again open the valve for the passage of make-up water to the brine tank.

Thus, the valve of Figs. 4–6 is a double-acting valve which operates in conjunction with the double-acting float check valve of the brine tank to positively shut off flow both to and from the brine tank at predetermined brine levels.

It will be understood that the particular forms of valve elements illustrated in the drawing and described in detail are merely exemplary of the mechanical expedients that may be employed in carrying out the invention. As has already been stated, a flexible diaphragm may be used instead of the piston 17. A conventional ball or disk type valve plug may be used in place of O-ring 24 to cooperate with a seat at the bottom of the valve body surrounding channel 15 in place of the O-ring-cylinder arrangement. Also, a second O-ring could be employed in place of plug 37 to enter the central channel 15 from the top of the channel to close the valve upon downward movement of the valve piston. The counter-bore 35 is not essential and in this respect, as in many others, the specific design shown may be altered without departing from the essential structure and the mode of operation of the invention.

Invention is claimed as follows:

1. A brine tank control system for a water softener comprising a brine tank, a two-way float-controlled check valve arranged in said brine tank for checking the flow of brine therefrom and make-up water thereinto responsive to predetermined brine level conditions, an auxiliary valve of the pressure differential operated type having two ports and including an operating element having one surface thereof exposed to atmosphere and the other surface exposed to the pressure obtaining within said valve, brine tank conduit means connecting one port of said auxiliary valve with said float-controlled check valve, softener conduit means connected with the other port of said auxiliary valve, and means for alternately applying suction to said softener conduit means and connecting said softener conduit means with a source of water under superatmospheric pressure, whereby when suction is applied brine is withdrawn from said brine tank until flow is checked by said float-controlled check valve and when water under pressure is connected with said softener conduit means make-up water flows into said brine tank until flow is checked by said float-controlled check valve whereupon back pressure in said auxiliary valve causes said auxiliary valve to close.

2. A brine tank control system in accordance with claim 1 and including flow control means in the softener conduit means for limiting the rate of flow of water into the auxiliary valve.

3. A brine tank control system in accordance with claim 2 wherein the flow control means is a partial check valve arranged to limit flow into said auxiliary valve and permit substantially unimpeded flow therefrom.

4. A brine tank control system in accordance with claim 1 wherein the operating element of the auxiliary valve is biased toward open position of said valve.

5. A brine tank control system for a water softener comprising a brine tank, a two-way float-controlled check valve arranged in said brine tank for checking the flow of brine therefrom and make-up water thereinto responsive to predetermined brine level conditions, an auxiliary valve including a valve body having an axial bore and a chamber above and communicating with said bore at one end thereof, a valve stem in said bore and chamber, a valve plug on said stem adjacent its lower end, said valve stem in a first position thereof bringing the valve plug into coaction with said bore to close said bore, a differential pressure operating element in said chamber having its outer face exposed to atmospheric pressure and its inner face exposed to the pressure within said chamber, said operating element being affixed to the valve stem to control the movements thereof, spring means urging the valve stem to a second position in which the valve plug is beyond the bore to open said bore to the passage of liquid therethrough, brine tank conduit means connecting the other end of said bore with said float-controlled check valve, softener conduit means connected with said valve chamber, a partial check valve in said softener conduit means arranged to limit flow into said valve chamber and permit substantially unimpeded flow therefrom, and means for alternatively applying suction to said softener conduit means through said partial check and connecting said softener conduit means through said partial check with a source of water under superatmospheric pressure, whereby when suction is applied brine is withdrawn from said brine tank until flow is checked by said float-controlled check valve and when water under pressure is connected with said softener conduit means make-up water flows into said brine tank until flow is checked by said float-controlled check valve whereupon back pressure in said auxiliary valve chamber causes said auxiliary valve to close.

6. A brine tank control system in accordance with claim 5 wherein a second valve plug is provided on the valve stem for coacting with the bore in a third position of the valve stem in which the first-mentioned valve plug is still further beyond said bore, said second plug in said third position closing said bore, and spring means arranged to oppose movement of said valve stem from the second to the third position whereby greater suction within said auxiliary valve resulting from the checking of the flow of brine from the brine tank by the float-controlled check valve operates to move said auxiliary valve stem to the third position to close said auxiliary valve.

References Cited in the file of this patent

UNITED STATES PATENTS

| 549,877 | McAuley et al. | Nov. 12, 1895 |
|---------|----------------|---------------|
| 1,191,396 | Calton | July 18, 1916 |
| 1,349,443 | Stokes et al. | Aug. 10, 1920 |
| 1,393,217 | Haley | Oct. 11, 1921 |
| 2,178,866 | Thomas | Nov. 7, 1939 |
| 2,509,880 | Pelton | May 30, 1950 |
| 2,616,450 | Legge et al. | Nov. 4, 1952 |
| 2,660,834 | MacGlashan | Dec. 1, 1953 |
| 2,716,422 | Whitlock | Aug. 30, 1955 |
| 2,820,419 | Albertson | Jan. 21, 1958 |